United States Patent [19]

Hattori et al.

[11] Patent Number: 4,611,271

[45] Date of Patent: Sep. 9, 1986

[54] CONTROL SYSTEM WITH A MICROPROCESSOR

[75] Inventors: Shinichiro Hattori; Seiichi Hosoda; Masahide Kanno; Atsushi Amano, all of Tokyo, Japan

[73] Assignee: Olympus Optical Co., Ltd., Tokyo, Japan

[21] Appl. No.: 608,436

[22] Filed: May 9, 1984

[30] Foreign Application Priority Data

May 20, 1983 [JP] Japan .................................. 58-88809

[51] Int. Cl.$^4$ ............................................. G06F 11/00
[52] U.S. Cl. ........................................ 364/184; 371/12
[58] Field of Search .................... 371/8, 12, 14, 62; 364/184, 187; 331/145; 328/66, 67, 68

[56] References Cited

U.S. PATENT DOCUMENTS

| | | | |
|---|---|---|---|
| 4,072,852 | 2/1978 | Hogan | 371/12 |
| 4,153,198 | 5/1979 | Eki | 371/9 |
| 4,282,574 | 8/1981 | Yoshida | 371/12 |
| 4,363,092 | 12/1982 | Abo | 364/200 |
| 4,417,631 | 11/1983 | Johnson | 364/567 |
| 4,488,303 | 12/1984 | Abramovich | 371/12 |
| 4,491,241 | 1/1985 | Knepler | 364/555 |
| 4,494,213 | 1/1985 | Thompson | 364/510 |
| 4,500,951 | 2/1985 | Sugimoto | 371/9 |
| 4,506,338 | 3/1985 | Danno | 371/14 |
| 4,511,982 | 4/1985 | Kurakake | 371/9 |
| 4,531,198 | 7/1985 | Matsuda | 364/900 |
| 4,532,594 | 7/1985 | Hosaka | 371/9 |
| 4,541,050 | 9/1985 | Honda | 371/62 |
| 4,542,506 | 9/1985 | Oe et al. | 371/9 |

FOREIGN PATENT DOCUMENTS 56-52452 11/1981 Japan ...................................... 371/12

*Primary Examiner*—Jerry Smith
*Assistant Examiner*—Allen MacDonald
*Attorney, Agent, or Firm*—Frishauf, Holtz, Goodman & Woodward

[57] ABSTRACT

A control system with a microprocessor controls an output pressure of a water/air pump and a light amount of a light source lamp in an endoscope. Under control of a program, the microprocessor periodically accesses a decoder to periodically generate a pulse signal. The generated pulse signal is applied to a watch dog type detector for detecting an abnormal operation of the microprocessor. When the microprocessor operates abnormally and is detected, the microprocessor is reset, and an output pressure of a water/air pump and a light amount of a light source lamp are respectively set at the maximum levels independently of the control by the microprocessor.

5 Claims, 11 Drawing Figures

14,611,271

CONTROL SYSTEM WITH A MICROPROCESSOR

BACKGROUND OF THE INVENTION

The present invention relates to a control system with a microprocessor, and more particularly to a control system with a microprocessor for preventing a device under control from erroneously operating due to an abnormal operation of the microprocessor.

Recently, a microprocessor has found diverse application in controlling an unlimited number of devices, apparatuses and equipments in a variety of fields. The microprocessor executes control operations of devices under control of a program already designed and prepared. Some disturbances, for example, noise, often puts the microprocessor into an abnormal mode of operation, so that the microprocessor erroneously executes the program. In the approach most often taken for preventing this, the microprocessor is checked as to whether it is in an abnormal mode of operation. When it is determined that the microprocessor is operating abnormally, the microprocessor is immediately reset and returned to a normal mode of operation. However, it may occur that the microprocessor which is operating abnormally is not returned to the normal mode of operation even though it is reset. In such a case, a symptom of the abnormality of the microprocessor operation can be recognized by carefully observing the operation of a device under control by the microprocessor. Therefore, the erroneous control by the microprocessor can be stopped. Some types of such abnormal operations, however, can not be recognized from the operation of a device under control. For example, in the case of controlling a display device, the display device presents the visual contents common to the normal and abnormal operations. It is impossible to check such the abnormal operation and to stop the abnormal running of the microprocessor in such case. This is particularly detrimental to the control of medical equipment such as an endoscope.

SUMMARY OF THE INVENTION

Accordingly, an object of the present invention is to provide a control system with a microprocessor which prevents an abnormal operation due to the abnormal operation of the microprocessor and visually and distinctly presents an indication of the abnormal operation of the microprocessor, thereby improving the reliability of the control system.

To achieve the above object, there is provided a control system with a microprocessor comprising a detector for detecting an abnormal operation of the microprocessor and for resetting the microprocessor upon detection of the abnormal operation, a control unit for controlling a device under control according to the output signal of the microprocessor and for placing the device under control into a specific operating condition upon detection of the abnormal condition, a first display for displaying an operating state of the device under control, the display being set in a specific operating state upon detection of the abnormal condition, and a second display for displaying an abnormal operation of the microprocessor upon detection of the abnormal condition.

With such an arrangement, an abnormal operation of the microprocessor is detected, and the device under control is placed in a specific and proper operating state. This feature removes the problem, which arises from the unarrested abnormal running of the microprocessor even despite a reset operation.

DETAILED DESCRIPTION OF THE PREFERRED EMBODIMENT

Figure 1:
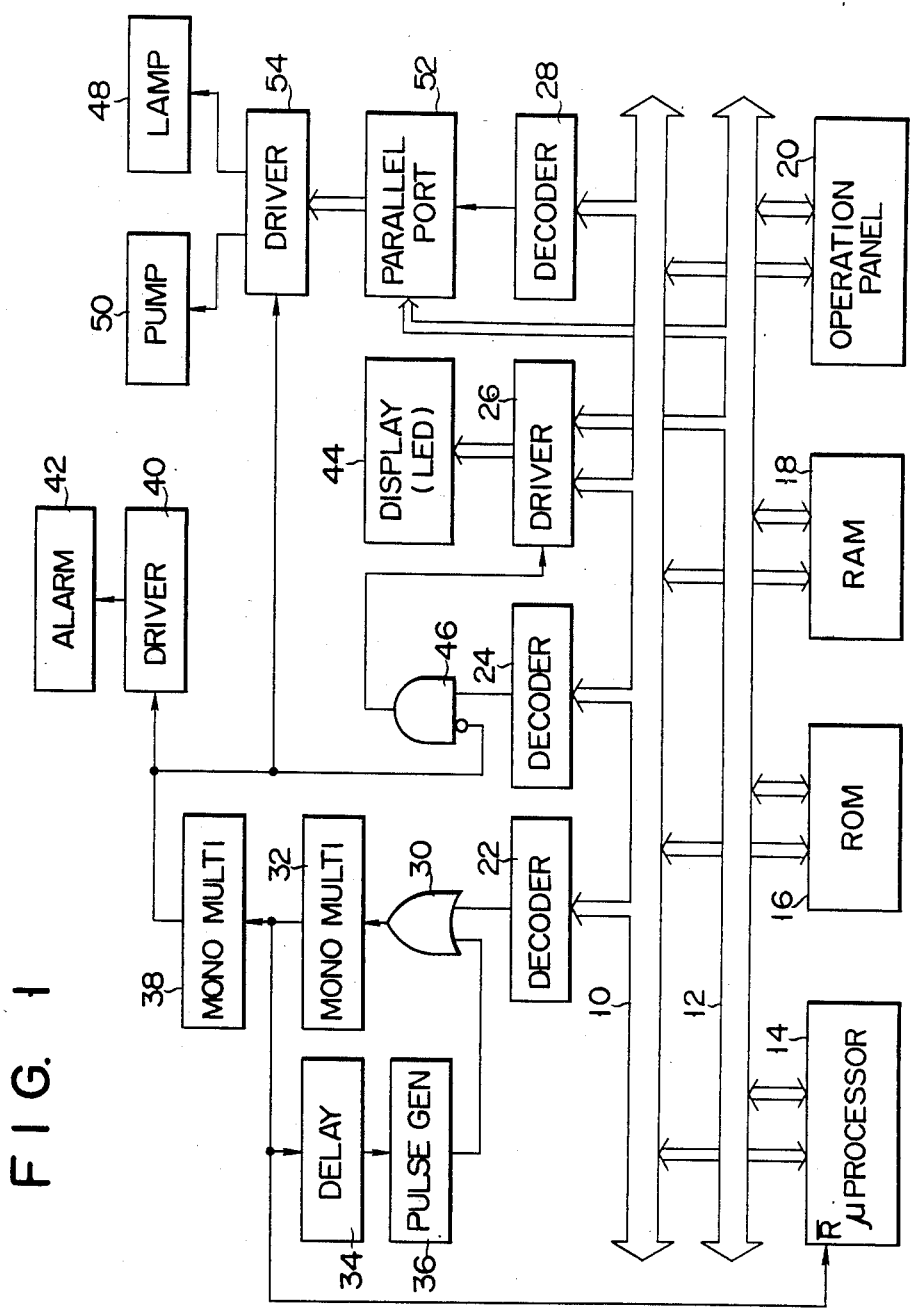
FIG. 1 is a block diagram of an embodiment of a control system according to the present invention.

An embodiment of a control system with a microprocessor according to the present invention will be described referring to the accompanying drawings. In a control system illustrated in FIG. 1, a microprocessor 14 controls an endoscope containing a light source lamp 48 for illuminating the inside of body cavities and a water/air feed pump 50 for washing and dehydrating an objective lens. As shown, the microprocessor 14, a ROM 16, a RAM 18 and an operation panel 20 are connected to an address/control bus 10 and a data bus 12. The ROM 16 stores a program to be executed by the microprocessor 14. The operation panel 20 is used for entering various data and commands for the system operations. The address/control bus 10 is also connected to a decoder 22, a decoder 24, a driver 26 and a decoder 28. The program stored in the ROM 16 is designed so as to periodically specify the decoder 22 by an interrupt routine. The output signal of the decoder 22 is input to the first input terminal of an OR gate 30. The output signal of the OR gate 30 is supplied to the trigger terminal of a retriggerable monostable multivibrator 32. The output signal of the monostable multivibrator 32 is input to the second terminal of the OR gate 30, via a delay circuit 34 and a pulse generator 36, and also supplied to the negative logic reset terminal $\overline{R}$ of the microprocessor 14, and to the trigger terminal of a retriggerable monostable multivibrator 38. The time constant of the monostable multivibrator 38 is longer than that of the monostable multivibrator 32. The address decoder 22, the OR gate 30, and the monostable multivibrators 32 and 38 cooperate to form a watch dog type abnormal operation detector for detecting an abnormal operation of the microprocessor 14. The output signal of the monostable multivibrator 38 is supplied through a driver 40 to an alarm device 42 for audibly and visually notifying an operator of the abnormal operation of the microprocessor 14.

A driver 26 is for driving a display 44, for example, of the LED type. Data from the data bus 12 is also supplied to the driver 26. A decoder 24 is for selecting the driver 26. A display 44 visually displays various operating states of an endoscope, for example, an operating state of the light source lamp 48 for illuminating the inside of body cavities and an operating state of the water/air pump 50 for washing and dehydrating the objective lens. The output signal of the decoder 24 is supplied to the first input terminal of and AND gate 46. The output signal of the monostable multivibrator 38 is inverted and input to the second input terminal of the AND gate 46. The output signal of the AND gate 46 is supplied to the control terminal of the driver 26. The driver 26, when its control terminal is in a certain logical level, e.g. a low level, operates independently of the control by the microprocessor 14. A decoder 28 selects either the light source lamp 48 or the water/air pump 50. The output signal of the decoder 28 is supplied to a parallel part 52. The data bus 12 places data on the parallel port 52. The output signal of the parallel port 52 drives a driver 54 for driving the light source lamp 48 and the water/air pump 50. The output signal of the monostable multivibrator 38 is also connected to the control terminal of the driver 54. The driver 54, when its control terminal has a certain logic level, e.g. a high level, is in operation beyond the control by the signal output from the parallel port 52.

The operation of the control system thus arranged will be described. The microprocessor 14 executes a program stored in the ROM 16 to control the light source lamp 48 and the water/air pump 50 through a route containing the decoder 28, the parallel port 52 and the driver 54. For displaying operating states of the light source lamp 48 and the water/air pump 50, the microprocessor 14 drives the display 44 through a route containing the decoder 24, the AND gate 46 and the driver 26. As described above, as long as the program in the ROM 16 is normally executed, an address of the decoder 22 is periodically specified by an interrupt routine. Accordingly, the decoder 22 periodically produces a pulse signal when the microprocessor 14 normally operates. The period of the pulse signal generated is shorter than a time constant (the width of the output pulse) of the monostable multivibrator 32. With this time relation, the decoder 22 produces a next pulse when the output signal of the monostable multivibrator 32 lasts in a high level when the microprocessor 14 has a normal operation. A level change of the pulse signal produced from the decoder 22, more exactly, a trailing edge of the pulse signal, triggers again the monostable multivibrator 32. Accordingly the monostable multivibrator 32 is successively triggered to always apply the high level output signal to the reset terminal $\overline{R}$ (negative logic) of the microprocessor 14 and the trigger terminal of the monostable multivibrator 38. In this way, the microprocessor 14 normally operates free from the resetting. The monostable multivibrator 38 is wired such that, responsive to a transition (trailing edge) of the output signal of the monostable multivibrator 32, it is triggered to produce an output signal. Therefore, at this time, the monostable multivibrator 38 is not triggered and produces no output signal. Let use consider an abnormal operation of the microprocessor 14, viz. a situation that an endless loop is formed in the program, the interrupt routine is not executed, and now addressing to the decoder 22 can not be executed. In this situation, the monostable multivibrator 32 provides an output signal to the monostable multivibrator 38. Accordingly, the microprocessor 14 is reset, and the monostable multivibrator 38 is triggered to produce an output signal. Then, the driver 40 energizes the alarm device 42.

Figure 2A:
FIGS. 2A to 2E show timing diagrams of the operation of the control system when a microprocessor is returned to a normal operation upon its being reset.
Figure 2B:
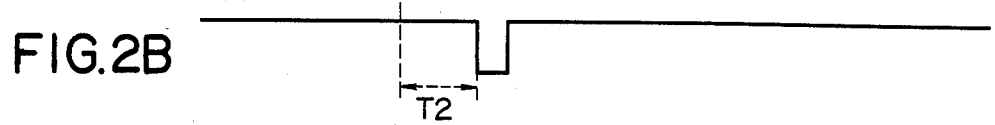
Figure 2C:
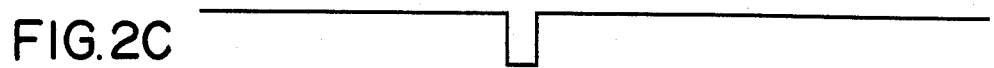
Figure 2D:
Figure 2E:
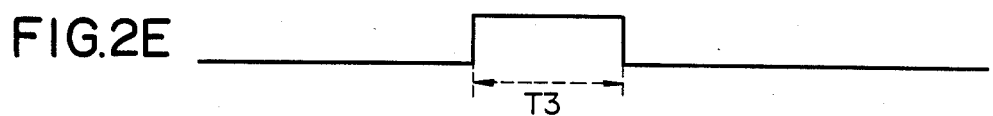

When reset, the microprocessor 14 takes one of two statuses. In the first status, it is returned to a normal operation. In the second status, it is not returned to a normal operation. These two statuses will individually be described. The first status that the microprocessor 14 returns to a normal operation upon reset operation, will first be given referring to FIGS. 2A to 2E. FIG. 2A shows a waveform of the output signal of the address decoder 22. FIG. 2B shows a waveform of the output signal of the monostable multivibrator 32. FIG. 2C shows a waveform of the output signal of the delay circuit 34. FIG. 2D shows a waveform of the output signal of the pulse generator 36. FIG. 2E shows a waveform of the monostable multivibrator 38. As shown in FIG. 2A, when the microprocessor 14 normally operates, the decoder 22 produces pulses at periods T1. Under this condition, the output signals of the monostable multivibrator 32 and the delay circuit 34 continue in a high level, as shown in FIGS. 2B and 2C. The output signal of the pulse generator 36 is in a low level as shown in FIG. 2D, since the pulse generator 36 is triggered in response to a level change (falling edge) of an input signal thereto, i.e. the output signal of the delay circuit 34. The output signal of the monostable multivibrator 38, which is triggered with the transition of the input signal thereto, also keeps a low level, as shown in FIG. 2E, because the output signal of the monostable multivibrator 32 continues in a high level, has not transition.

When the microprocessor 14 operates abnormally, the decoder 22 stops its signal outputting, as shown in FIG. 2A. After a time duration T2 (a time constant of the monostable multivibrator 32) succeeding to the trailing edge of the final pulse from the decoder 22, the output signal of the monostable multivibrator 32 goes negative, as shown in FIG. 2B. In response of the the level change (falling edge) of the output signal of the monostable multivibrator 32, the monostable multivibrator 38 is triggered to be high for a period T3, as shown in FIG. 2E. The high level signal produced by the monostable multivibrator 38 drives, through the driver 40, the alarm device 42 to notify an operator an abnormal running of the microprocessor 14. The low level output signal from the monostable multivibrator 32 resets the microprocessor 14. It is assumed that the microprocessor 14, when reset, returns to its normal operation. Then, after a short delay (which is more than sufficient for the microprocessor 14 when it is reset and returns to a normal operation), the output of the delay circuit 34 also goes low, as shown in FIG. 2C. On the falling edge of the output signal from the delay circuit 34, the pulse generator 36 starts generation of a pulse signal at high frequency, as shown in FIG. 2D. The high frequency pulse signal generated triggers the monostable multivibrator 32, through the OR gate 30. The triggered monostable multivibrator 32 again goes high, as shown in FIG. 2B. This high level removes a reset command to the microprocessor 14. The microprocessor 14 returns to a normal operation. Upon removal of the reset command, the address decoder 22 resumes the periodic generation of a pulse signal, as shown in FIG. 2A. In this way, the control system again starts its normal operation. As shown in FIG. 2C, the output signal of the delay circuit 34 returns to a high level with a short time delay after the output signal of the monostable multivibrator 32 becomes high.

When the abnormal operation of the microprocessor 14 is detected, the monostable multivibrator 38 is triggered to produce a high level signal, as shown in FIG. 2E. This high level causes the AND gate 46 to be disabled. Then, the control terminal of the driver 26 goes low. Under this condition, the driver 26 is not under control of the microprocessor 14, and places the display 44 in a specific operating state, for example, an extinguished state or an abnormal display mode. This is done for making the alarm producing by the alarm device 42 more noticeable. The high level on the output of the monostable multivibrator 38 sets a high level on the control terminal of the driver 54. At this time, the driver 54 escapes from the control by the parallel port 52 which is now under control of the erroneously running microprocessor 14. Under this condition, the driver 54 sets the light source lamp 48 and the water/air pump 50 in specific modes. For example, when the lamp 48 is a halogen lamp, it maximizes an amount of emitting light. If the lamp 48 is a xenon lamp, it sets an amount of emitting light in an intermediate level. The water/air pump 50 maximizes its output pressure. Such specific modes are set up in order to prevent, for example, an exceeding or abnormal decrease in the light amount and the output pressure respectively of the lamp 48 and the pump 50.

Figure 3A:
FIGS. 3A to 3E show timing diagrams of the operation of the control system when the microprocessor will not return to a normal mode of operation even though it is reset.
Figure 3B:
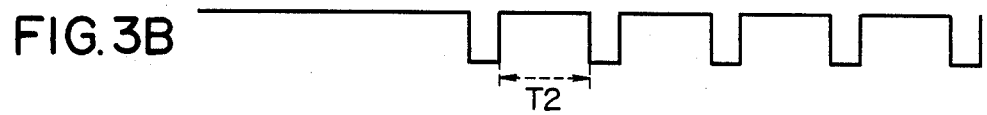
Figure 3C:
Figure 3D:
Figure 3E:
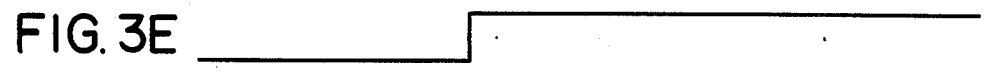

The second status in which the microprocessor 14 cannot be returned to normal mode of operation through the reset operation, will now be described. Reference is made to FIGS. 3A to 3E which respectively correspond to FIGS. 2A to 2E. The operating process of the control system from the detection of the abnormal operation of the microprocessor 14 till the microprocessor 14 is reset, is the same as that as stated previously. In this situation, after the output signal of the monostable multivibrator 32 goes low as shown in FIG. 3B, the decoder 22 produces still no pulse signal, as in FIG. 3A. And the output of the monostable multivibrator 32 returns to a low state at intervals T2. The time constant T3 of the monostable multivibrator 38 is longer than that T2 of the monostable multivibrator 32. Therefore, when the output signal of the monostable multivibrator 38 lasts in the high level, the monostable multivibrator 32 applies the next pulse signal and triggers the monostable multivibrator 38 with a transition, or at the falling edge, of its output signal recurring after every time period T2. As a result, the output of the monostable multivibrator 38 maintains the high level, as shown in FIG. 3E. This continuous high level of the output signal from the monostable multivibrator 38 continuously energizes the alarm device 42 and at the same time maintains the preset operating state of the display 44, the light source lamp 48 and the water/air pump 50. In this way, the control system can present visually and audibly the operation abnormality of the microprocessor 14 to an operator.

As described above, in the control system according to the present invention, when the abnormality of the microprocessor is detected, the device under control is placed in a specific and proper condition. This feature removes the disadvantages caused by the abnormal running of the microprocessor. Upon detection of the abnormalility of the microprocessor 14, the ordinary display is placed in a specific condition. Because of this feature, an operator never fails to see the lighting by the alarm indicator to indicate the abnormality of the microprocessor.

It should be understood that the present invention is not limited to the above specific embodiment. For example, the time constant of the monostable multivibrator 38 may theoretically be equal to that of the monostable multivibrator 32. The device under control is not limited to the above-mentioned one, as a matter of course.

What is claimed is:

1. A control system with a microprocessor, comprising:
   decoder means (22) coupled to the microprocessor for periodically generating a signal when the microprocessor is operating in a normal state;
   OR gate means (30) having first and second input terminals, the signal from said decoder means (22) being supplied to the first input terminal;
   first multivibrator means (32) with a first time constant for supplying a first output signal in response to an output signal from the OR gate means (30), said first output signal being supplied to the microprocessor as a reset signal;
   delay means (34) for delaying the first output signal from the first multivibrator means (32);
   trigger signal generating means (36) coupled to receive an output signal from the delay means (34) and for supplying the trigger signal to the second input terminal of said OR gate means (30);
   second multivibrator means (38) with a second time constant which is longer than the first time constant for receiving the first output signal from said first multivibrator means (32) and for outputting in response thereto an abnormal detection signal;
   means (54) for controlling an object device (48, 50) in response to the output signal of the microprocessor and for placing the object device (48, 50) in a specific operational condition in response to the abnormal detection signal; first means (44) coupled to the microprocessor for indicating an operational state of the object device (48, 50), the first means also being coupled to said second multivibrator means and being set in a specific operational state in response to the abnormal detection signal; and
   second means (42) coupled to the second multivibrator means for indicating an abnormal operation of the microprocessor in response to the abnormal detection signal.

2. A control system with a microprocessor according to claim 1, in which said first indicating means is deenergized upon detection of the abnormal operation.

3. A control system according to claim 2, wherein the first indicating means normally provides a visual display.

4. A control system according to claim 1, in which said second indicating means is deenergized when said second multivibrator means stops outputting the abnormal detection signal.

5. A control system according to claim 4, wherein the second indicating means provides a visual display.

* * * * *